US012637563B2

(12) United States Patent
Yamamoto et al.

(10) Patent No.: US 12,637,563 B2
(45) Date of Patent: May 26, 2026

(54) MODIFIERS FOR POLYESTERS THAT IMPROVE VISCOSITY IN MELT

(71) Applicant: Kaneka Americas Holding, Inc., Pasadena, TX (US)

(72) Inventors: Tetsuro Yamamoto, Pasadena, TX (US); Noah Boyd, Pasadena, TX (US); Yoshiaki Matsuoka, Osaka (JP); Shusuke Yoshihara, Pasadena, TX (US); Ian Winters, Houston, TX (US)

(73) Assignee: Kaneka Americas Holding, Inc., Pasadena, TX (US)

( * ) Notice: Subject to any disclaimer, the term of this patent is extended or adjusted under 35 U.S.C. 154(b) by 865 days.

(21) Appl. No.: 17/798,003

(22) PCT Filed: Feb. 5, 2021

(86) PCT No.: PCT/US2021/016940
§ 371 (c)(1),
(2) Date: Aug. 5, 2022

(87) PCT Pub. No.: WO2021/159009
PCT Pub. Date: Aug. 12, 2021

(65) Prior Publication Data
US 2023/0062748 A1 Mar. 2, 2023

Related U.S. Application Data

(60) Provisional application No. 62/970,536, filed on Feb. 5, 2020.

(51) Int. Cl.
C08L 67/02 (2006.01)

(52) U.S. Cl.
CPC ......... C08L 67/02 (2013.01); C08L 2205/035 (2013.01)

(58) Field of Classification Search
CPC .... C08L 2205/035; C08L 25/14; C08L 67/02; C08L 13/00; C08L 2023/40; C08L 2023/44; C08F 212/08; C08F 220/1804; C08F 220/325; C08F 257/02; Y02W 30/62
See application file for complete search history.

(56) References Cited

U.S. PATENT DOCUMENTS

| | | | |
|---|---|---|---|
| 6,984,694 B2 | 1/2006 | Blasius, Jr. et al. | |
| 2008/0206503 A1* | 8/2008 | Blasius | C08L 25/14 |
| | | | 428/36.9 |
| 2012/0184678 A1 | 7/2012 | Deeter et al. | |
| 2017/0313813 A1 | 11/2017 | Wolf et al. | |

FOREIGN PATENT DOCUMENTS

| | | |
|---|---|---|
| CN | 1745137 A | 3/2006 |
| CN | 102844336 A | 12/2012 |
| JP | 2002249649 A | 9/2002 |
| JP | 2015525813 A | 9/2015 |
| KR | 10-2014-0147294 A | 12/2014 |
| KR | 10-2019-0077413 A | 7/2019 |

OTHER PUBLICATIONS

Wang, Xuman, et al. "Polymeric Nanocomposites," Northwestern Polytechnical University Press, Aug. 31, 2017 (3 pages).
Wu, Peixi, et al., "Blending and Modification of Polymers," China Light Industry Press, Aug. 31, 2017 (3 pages).
Office Action issued in counterpart Chinese Patent Application No. 202180015077.4, dated Oct. 12, 2023, with translation (11 pages).
Office Action issued in counterpart Japanese Patent Application No. 2022-547719, mailed Oct. 31, 2023, with translation (10 pages).
International Search Report issued in International Application No. PCT/US2021/016940, mailed May 31, 2021 (5 pages).
Written Opinion issued in International Application No. PCT/US2021/016940, mailed May 31, 2021 (6 pages).
Office Action issued in the counterpart Chinese Patent Application No. 202180015077.4, mailed May 31, 2023 (18 pages).

* cited by examiner

*Primary Examiner* — Ana L. Woodward
(74) *Attorney, Agent, or Firm* — Osha Bergman Watanabe & Burton LLP

(57) ABSTRACT

A viscosity modifier for a condensation polymer may include a chain extender comprising at least one reactive monomer and at least one vinyl monomer copolymerizable with the reactive monomer, the chain extender being present in an amount ranging from 15 to 70 wt % of the viscosity modifier; and a non-condensation carrier resin present in an amount ranging from 30 to 85 wt % of the viscosity modifier. Condensation polymer compositions, methods of forming viscosity modifiers, and methods of molding condensation polymer compositions are also provided.

20 Claims, No Drawings

MODIFIERS FOR POLYESTERS THAT IMPROVE VISCOSITY IN MELT

BACKGROUND

Condensation polymers are widely used in industry because of their qualities such as transparency, mechanical properties, gas barrier properties and heat resistance, as well as chemical properties such as solvent resistance, economical efficiency, and recyclability. They are commonly used as packaging materials in various products such as bottles.

Typically, those products are made by thermal processing under high temperature conditions (such as injection and extrusion molding followed by profile or sheet forming, thermofoaming, blow molding, or fiber spinning) There may be degradation in the materials after not only those moldings but also after their intended uses by humans. In recent years, increased attention has been focused on improved methods of reclaiming and recycling the plastics made from these polymers, with an eye toward resource conservation and environmental protection. The processing steps involved in recycling these polymers involve high temperatures in melt processing, such as when injection molding and extrusion molding are conducted.

While industry tries to use higher ratios of recycled materials with the same physical properties of virgin materials, there is a demand for increased melt viscosity. There are two industrial methods to increase the melt viscosity of condensation resin. A first method involves using polycondensation equipment for repetitive polycondensation. This method has the advantage of not introducing new ingredients into the condensation polymer. However, this method also takes a long time and needs significant investment in equipment. A second method for increasing melt viscosity involves a chain extender. This method has the advantage of allowing downstream parties, such as a compounder, sheet or bottle manufacturer, etc. to increase melt viscosity easily.

There are several types of chain extenders that are commercially available, and each has its disadvantages. For instance, phosphite-based chain extenders have the disadvantage of being highly volatile, high viscosity liquids which are difficult to handle, susceptible to hydrolysis, and suspected endocrine disrupters. Some ethylene-based epoxy-functional chain extenders have the disadvantage of having high molecular weights which induces increasing the chance of gel formation, and altering chemical resistance and clarity. Titanate- and zirconate-based chain extenders have the disadvantages of high cost, induced color in the product, difficulty of handling due to solvent diluents, and viscosity reduction. Isocyanate-based chain extenders suffer from toxicity concerns, reactivity to moisture, and general handling problems.

U.S. Pat. No. 6,984,694 describes chain extenders as resulting in the polycondensates having a higher melt viscosity at low dosage without gel formation. However, thermoplastics manufacturers still experience issues, such as difficulty with dosage control (resulting in inconsistency of melt viscosity and gel formation) and suffering from bridging at the extruder hopper due to low melting temperature of the chain extender.

Accordingly, there exists a need for continuing improvements in the processability of condensation polymers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a viscosity modifier for a condensation polymer that includes a chain extender comprising at least one reactive monomer and at least one vinyl monomer copolymerizable with the reactive monomer, the chain extender being present in an amount ranging from 15 to 70 wt % of the viscosity modifier, and a non-condensation carrier resin present in an amount ranging from 30 to 85 wt % of the viscosity modifier.

In another aspect, embodiments disclosed herein relate to a condensation polymer composition that includes a viscosity modifier and at least one condensation polymer. The viscosity modifier includes a chain extender comprising at least one reactive monomer and at least one vinyl monomer copolymerizable with the reactive monomer, the chain extender being present in an amount ranging from 15 to 70 wt % of the viscosity modifier, and a non-condensation carrier resin present in an amount ranging from 30 to 85 wt % of the viscosity modifier.

In another aspect, embodiments disclosed herein relate to a molded article that includes a condensation polymer composition having a viscosity modifier and at least one condensation polymer. The viscosity modifier includes a chain extender comprising at least one reactive monomer and at least one vinyl monomer copolymerizable with the reactive monomer, the chain extender being present in an amount ranging from 15 to 70 wt % of the viscosity modifier, and a non-condensation carrier resin present in an amount ranging from 30 to 85 wt % of the viscosity modifier.

In yet another aspect, embodiments disclosed herein relate to a method that includes forming a viscosity modifier by powder blending, melt blending, or emulsion polymerization. The viscosity modifier includes a chain extender comprising at least one reactive monomer and at least one vinyl monomer copolymerizable with the reactive monomer, the chain extender being present in an amount ranging from 15 to 70 wt % of the viscosity modifier, and a non-condensation carrier resin present in an amount ranging from 30 to 85 wt % of the viscosity modifier.

In yet another aspect, embodiments disclosed herein relate to a method that includes molding a condensation polymer composition having a viscosity modifier and at least one condensation polymer. The viscosity modifier includes a chain extender comprising at least one reactive monomer and at least one vinyl monomer copolymerizable with the reactive monomer, the chain extender being present in an amount ranging from 15 to 70 wt % of the viscosity modifier, and a non-condensation carrier resin present in an amount ranging from 30 to 85 wt % of the viscosity modifier.

Other aspects and advantages of the claimed subject matter will be apparent from the following description and the appended claims.

DETAILED DESCRIPTION

In one aspect, embodiments disclosed herein relate to a viscosity modifier for a condensation polymer, where the viscosity modifier is preferably prepared by emulsion polymerization. In particular, the viscosity modifier may be refractive index-matched with the condensation polymer and contain a chain extender reactive with the condensation polymer and a carrier resin which is compatible but not reactive with the chain extender. Thus, the carrier resin may capture the chain extender in the microstructure matrix such that, as the modifier is melted during the compounding of the condensation polymer, the chain extender is held in the carrier resin matrix until the carrier resin melts (at a higher temperature), which may result in the chain extender more easily and evenly mixing into the condensation polymer.

In one or more embodiments, the viscosity modifier may include a chain extender present in an amount ranging from 15-70 wt % of the viscosity modifier. In particular, the chain extender may be present at a lower limit ranging from any of 15, 20, 30, or 40 wt %, and an upper limit of any of 45, 50, 60, and 70 wt %, where any lower limit can be used in combination with any upper limit.

Further, in one or more embodiments, the viscosity modifier may include a carrier resin present in an amount ranging from 30-85 wt % of the viscosity modifier. In particular, the carrier resin may be present at a lower limit ranging from any of 30, 40, or 50 wt %, and an upper limit of any of 60, 70, 80, and 85 wt %, where any lower limit can be used in combination with any upper limit.

In one or more embodiments, the viscosity modifier may be added to the condensation polymer in an amount ranging from 0.2 to 10 phr (parts per hundred resin), or from a lower limit of any of 0.2, 0.5, and 1 phr, to an upper limit of any of 3, 5, and 10 phr, where any lower limit can be used with any upper limit.

In addition to the carrier resin and chain extender, in one or more embodiments, the viscosity modifier may also be blended with conventionally known additives including, for example: antioxidants, such as phenolic antioxidants, phosphorus-based antioxidants, and sulfur based antioxidants; anti-dripping agents; polymer processing aids, such as high molecular weight poly(methyl methacrylate) based resins; flame retardants, such as silicone resins, red phosphorus, and (condensed) phosphates; impact modifiers such as butadiene-methyl methacrylate-styrene copolymers, or graft-copolymers (obtained by graft-copolymerizing methyl methacrylate, styrene, acrylonitrile, etc. onto alkyl (meth)acrylate rubber or composite rubber comprising alkyl (meth)acrylate rubber and polyorganosiloxanes); melt flow-improving agents, such as terpene resins and acrylonitrile-styrene copolymers; plasticizers; lubricants; ultraviolet absorbers; pigments; fiber reinforcing agents, such as glass fibers; fillers, such as talc, mica, calcium carbonate, oxides of titanium, zinc oxide nano-particles, layer silicate, metallic micro-particles, and carbon nanotubes; polymer lubricants; polyorganosiloxanes with functional groups, such as polyorganosiloxane; antistatic agents, such as alkylene glycols, glycerol, and fatty acid esters; and mold-release agents, such as monoglycerides, silicone oils, and polyglycerols.

Chain Extender

The chain extender is reactive with the condensation polymer and thus may contain at least one reactive group selected from the group consisting of an epoxy group, a hydroxyl group, a carboxyl group, an isocyanate group, an acid anhydride group, and an acyl chloride group. In addition to a reactive monomer (containing such reactive functionality), the chain extender also includes at least one vinyl monomer copolymerizable with the reactive monomer. The chain extenders may be obtained by polymerizing (a) 5 to 90% by weight of reactive monomer, preferably with a lower limit of any of 5, 7, 10, or 15 wt % and an upper limit of any of 30, 50, 75, and 90 wt %, where any lower limit can be used in combination with any upper limit, and (b) 10 to 95% by weight of at least one vinyl monomer copolymerizable therewith, preferably with a lower limit of any of 10, 25, 40, 60, or 70, and an upper limit of any of 70, 85, 90, 93, or 95 wt %, where any lower limit can be used in combination with any upper limit, where (a) and (b) total 100% by weight.

As mentioned above, reactive monomers may include at least one reactive group selected from the group consisting of an epoxy group, a hydroxyl group, a carboxyl group, an isocyanate group, an acid anhydride group, and an acyl chloride group. Thus, one or more embodiments monomers having reactivity with the condensation polymer may include monomers such as (meth)acrylates having a functional group, including (meth)acrylate containing an epoxy group, alkyl (meth)acrylate containing a hydroxy group, and (meth)acrylate containing a carboxyl group; monomers having a functional group such as an isocyanate group, an acid anhydride group, and an acyl chloride group are preferable. For example, reactive monomers may include acrylates having an alkyl group with 1 to 22 carbon atoms and a hydroxyl group such as 2-hydroxyethyl acrylate and 4-hydroxybutyl acrylate or methacrylates having an epoxy group such as glycidyl methacrylates. In particular embodiments, from the viewpoint of favorable reactivity, (meth)acrylate containing an epoxy group may be used. In the present disclosure, unless indicated otherwise, (meth)acrylate refers to acrylate and/or methacrylate.

Specific examples of the (meth)acrylate containing an epoxy group are acrylates containing an epoxy group such as glycidyl acrylate and methacrylate s containing an epoxy group such as glycidyl methacrylate. These can be used alone or as two or more in combination.

Examples of the (meth)acrylate containing a hydroxy group are hydroxyethyl methacrylate, hydroxyethyl acrylate, hydroxypropyl methacrylate, and hydroxypropyl acrylate. Examples of the (meth)acrylate containing a carboxyl group are methacrylic acid and acrylic acid.

In one or more embodiments, the copolymerizable monomer may include acrylates, methacrylates, vinyl cyanides, vinyl acetate, and styrenes. However, it is understood that, as long as the copolymerizable monomer (in the chain extender) is not reactive during polymerization and melt processing, any copolymerizable monomer may be used.

The methacrylate monomer may include, for example, methacrylates having an alkyl group with 1 to 22 carbon atoms, such as methyl methacrylate, ethyl methacrylate, propyl methacrylate, butyl methacrylate, 2-ethylhexyl methacrylate, octyl methacrylate, dodecyl methacrylate, stearyl methacrylate, and behenyl methacrylate; and methacrylates having an alkyl group with 1 to 22 carbon atoms and an alkoxy group. The number of carbon atoms of the alkyl group in the methacrylate is not necessarily limited, but, for example, if the number of carbon atoms is more than 22, the polymerizability may be deteriorated, and thus preferable to use the methacrylates having an alkyl group with 22 or fewer carbon atoms. The methacrylates having an alkyl group with 1 to 12 carbon atoms are more preferable, and the methacrylates having an alkyl group with 1 to 8 carbon atoms are even more preferable because they have excellent compatibility with the polyester resin.

The acrylate monomer may include, for example, methacrylates having an alkyl group with 1 to 22 carbon atoms, such as methyl methacrylate, ethyl methacrylate, propyl methacrylate, butyl methacrylate, 2-ethylhexyl methacrylate, octyl methacrylate, dodecyl methacrylate, stearyl methacrylate, and behenyl methacrylate; and acrylates having an alkyl group with 1 to 22 carbon atoms and an alkoxy group. The number of carbon atoms of the alkyl group in the acrylate is not necessarily limited, but, for example, if the number of carbon atoms is more than 22, the polymerizability may be deteriorated, and thus it is preferable to use the acrylates having an alkyl group with 22 or fewer carbon atoms. The acrylates having an alkyl group with 1 to 12 carbon atoms are more preferable, and the acrylates having an alkyl group with 1 to 8 carbon atoms are even more preferable, because they have excellent compatibility with the polyester resin. The other alkyl (meth)acrylate is not particularly limited and examples are alkyl acrylates containing an alkyl group having 1 to 8 carbon atoms such as 2-ethyl hexyl acrylate, butyl acrylate, ethyl acrylate and methyl acrylate and alkyl methacrylates containing an allyl group having 1 to 8 carbon atoms such as 2-ethyl hexyl methacrylate, butyl methacrylate, ethyl methacrylate and methyl methacrylate. These can be used alone or in combination.

Aromatic vinyl monomers and cyanized vinyl monomers may be included in a chain extender. Examples of the aromatic vinyl monomers are styrene, vinyltoluene, α-methylstyrene, 4-methylstyrene, 3-methylstyrene, 4-methoxystyrene, 4-ethylstyrene, 4-ethoxystyrene, 3,4-dimethylstyrene, 2-chlorostyrene, 3-chlorostyrene, 4-chloro-3-methylstyrene, 3-(tert-butyl)styrene, 2,4-dichlorostyrene, 2,6-dichlorostyrene, and 1-vinylnaphthalene, and these are preferable from the viewpoint of maintaining the excellent transparency of condensation polyester resin. Examples of the cyanized vinyl monomers are acrylonitrile and methacrylonitrile. These can be used alone or in combination.

In one or more embodiments, the chain extender may be obtained by polymerizing (a) 10 to 90% by weight of (meth)acrylate containing an epoxy group, (b) 10 to less than 90% by weight of a vinyl monomer copolymerizable therewith [(a) and (b) total 100% by weight]; and having a number average molecular weight ranging from 1,000 to 10,000 Da.

The number average molecular weight (Mn) of the chain extender in the viscosity modifier for a condensation polymer of the present disclosure may range from 1,000 to 10,000 Da. For example, the Mn may have a lower limit of any of 1,000, 2,000, 3,000, 4,000 Da, (or in-between), and an upper limit from any of 6,000, 7,000, 8,000, 10,000 Da (or in-between), where any lower limit can be used with any upper limit. The number average molecular weight can be found, for example, by dissolving the sample in tetrahydrofurane (THF) and finding the soluble content thereof using gel permeation chromatography based on polystyrene (sample solution: sample 20 mg/THF 10 mL, measurement temperature: 25° C., detector: differential refraction system, injection amount: 1 mL).

In addition to number average molecular weight, the number average functionality (for the reactive groups, relative to the non-reactive groups) may range from 2 to 10, or more preferably having a lower limit any of 2 or 3 and an upper limit of any of 5, 6, 7, 8, or 10, where any lower limit can be used in combination with any upper limit. These characteristics are believed to allow for the condensation polymer's molecular weight increase at a given chain extender load, without the incidence of gelation and without adverse effects on the mechanical, thermal, or rheological properties at a target molecular weight.

The refractive index of the chain extenders is not particularly limited and is preferably adjusted to 1.4 to 1.58, in order to maintain the excellent transparency of condensation polymer. More preferably, when the condensation polymer is polyethylene terephthalate, the refractive index is adjusted to about 1.57, and when the thermoplastic polymer is PETG, the refractive index is adjusted to about 1.56. When condensation polymer is polylactic resin, the refractive index may be adjusted to the range of 1.4 to 1.5, and when the polylactic resin is polylactic acid, the refractive index may be adjusted to about 1.43. The refractive index in the present disclosure is the value at 23° C. and can be found by calculation based on literature values (for example, Polymer Handbook 4th Edition, John Wiley & Sons). In particular, the refractive index (RI) of the chain extender may, relative to the refractive index of the condensation polymer, have a ΔRI that is less than 0.03. In one or more particular embodiments, to have transparency, the ΔRI may be less than 0.02, or less than 0.01.

Non-Condensation Carrier Resin

The non-condensation carrier resin may be compatible with the condensation polymer (and chain extender) but not reactive with such chain extender. The carrier resin may have a higher melting point than the reactive chain extender. Thus, the carrier resin prevents bridging at the extruder hopper derived from the fusion of chain extenders to one another. The carrier resin may include one or more reactive monomers, which may be a monomer present in the chain extender and/or a reactive monomer which cannot react with the monomer in the chain extender. The reactive monomers in the carrier resin are present at an amount less than 10 wt % of the carrier resin.

Thus, in particular embodiments, the carrier resin may be formed from a methacrylate monomer, an acrylate monomer, a vinylaromatic monomer, cyanized vinyl monomer, vinyl acetate, and/or vinyl halide. However, it is understood that other monomers may be used, polymerizable by radical polymerization (specifically emulsion radical polymerization), but unlike the condensation polymer to which the viscosity modifier is added, the polymerized monomer is not subject to condensation polymerization. Depending on the selection of the condensation polymer, an appropriate carrier resin may be selected so as to be compatible with the condensation polymer. The non-condensation carrier resin is not reactive with the chain extender, preferably, so that the reactive functional group of the chain extender survives during the melt blending or emulsion polymerization to produce the viscosity modifier.

The amount of aromatic vinyl monomer may range from 0 to 95 wt %, preferably 50 to 90 wt %, and more preferably 80 to 90 wt %.

The vinyl monomer copolymerizable with the above monomers improves processability when molding the condensation polymer. Specific examples of the vinyl monomer are methyl acrylate, butyl acrylate, 4-hydroxybutyl acrylate, and glycidyl methacrylate, but are not limited thereto. These can be used alone or in combination. The amount of the vinyl monomer copolymerizable with the above monomers is 0 to 20 wt %, preferably 0 to 10 wt %, and more preferably 0 to 5 wt %.

The methacrylate monomer may include, for example, methacrylates having an alkyl group with 1 to 22 carbon atoms such as methyl methacrylate, ethyl methacrylate, propyl methacrylate, butyl methacrylate, 2-ethylhexyl methacrylate, octyl methacrylate, dodecyl methacrylate, stearyl methacrylate, and behenyl methacrylate; and methacrylates having an alkyl group with 1 to 22 carbon atoms and an alkoxy group. The number of carbon atoms of the alkyl group in the methacrylate is not necessarily limited, but, for example, if the number of carbon atoms is more than 22, the polymerizability may be deteriorated, and thus it is preferable to use the methacrylates having an alkyl group with 22 or fewer carbon atoms. The methacrylates having an alkyl group with 1 to 12 carbon atoms are more preferable, and the methacrylates having an alkyl group with 1 to 8 carbon atoms are even more preferable, because they have excellent compatibility with the polyester resin.

The acrylate monomer may include, for example, methacrylates having an alkyl group with 1 to 22 carbon atoms, such as methyl methacrylate, ethyl methacrylate, propyl methacrylate, butyl methacrylate, 2-ethylhexyl methacrylate, octyl methacrylate, dodecyl methacrylate, stearyl methacrylate, and behenyl methacrylate; acrylates having an alkyl group with 1 to 22 carbon atoms and a hydroxyl group such as 2-hydroxyethyl acrylate and 4-hydroxybutyl acrylate; acrylates having an epoxy group such as glycidyl acrylates; and acrylates having an alkyl group with 1 to 22 carbon atoms and an alkoxy group. The number of carbon atoms of the alkyl group in the acrylate is not necessarily limited, but, for example, if the number of carbon atoms is more than 22, the polymerizability may be deteriorated, and thus it is preferable to use the acrylates having an alkyl group with 22 or fewer carbon atoms. The acrylates having an alkyl group with 1 to 12 carbon atoms are more preferable, and the acrylates having an alkyl group with 1 to 8 carbon atoms are even more preferable because they have the excellent compatibility with the polyester resin. The other alkyl (meth)acrylate is not particularly limited and examples are alkyl acrylates containing an alkyl group having 1 to 8 carbon atoms, such as 2-ethyl hexyl acrylate, butyl acrylate, ethyl acrylate, and methyl acrylate, and alkyl methacrylates containing an alkyl group having 1 to 8 carbon atoms, such as 2-ethyl hexyl methacrylate, butyl methacrylate, ethyl methacrylate, and methyl methacrylate. These can be used alone or in combination.

Aromatic vinyl monomers and cyanized vinyl monomers may be included in carrier resin. Examples of the aromatic vinyl monomers are styrene, vinyltoluene, α-methylstyrene, 4-methylstyrene, 3-methylstyrene, 4-methoxystyrene, 2-(hydroxymethyl)styrene, 4-ethylstyrene, 4-ethoxystyrene, 3,4-dimethylstyrene, 2-chlorostyrene, 3-chlorostyrene, 4-chloro-3-methylstyrene, 3-(tert-butyl)styrene, 2,4-dichlorostyrene, 2,6-dichlorostyrene and 1-vinylnaphthalene and these may be preferable from the viewpoint of maintaining the excellent transparency of condensation polyester resin. Examples of the cyanized vinyl monomers are acrylonitrile and methacrylonitrile. These can be used alone or in combination.

The refractive index of the carrier resin is not particularly limited and is preferably adjusted to 1.4 to 1.58, in order to maintain the excellent transparency of condensation polymer. More preferably, when the condensation polymer is polyethylene terephthalate, the refractive index is adjusted to 1.57, and when the condensation polymer is PETG, the refractive index is adjusted to about 1.56. When the condensation polymer is polylactic resin, the refractive index may be adjusted to the range of 1.4 to 1.5, and when the polylactic resin is polylactic acid, the refractive index may be adjusted to about 1.43. The refractive index in the present disclosure is the value at 23° C. and can be found by calculation based on literature values (for example, Polymer Handbook 4th Edition, John Wiley & Sons). Moreover, in addition to the adjustment of the refractive index of the carrier, one or more embodiments may also include adjustment of the refractive index of the chain extender. In particular, the refractive index (RI) of the carrier resin may, relative to the refractive index of the condensation polymer, have a ΔRI that is less than 0.03. In one or more particular embodiments, to have transparency, the ΔRI may be less than 0.02, or less than 0.01.

The weight average molecular weight (Mw) of the carrier resin in the viscosity modifier for a condensation polyester resin of the present disclosure may range from 100,000 to 1,000,000 Da. The weight average molecular weight of the polymer may have a lower limit of any of 100,000, 120,000, 150,000, 200,000 Da, or in-between, and an upper limit of any of 300,000, 350,000, 400,000, 1,000,000 Da, or in-between, where any lower limit can be used in combination with any upper limit. The weight average molecular weight can be found, for example, by dissolving the sample in tetrahydrofurane (THF) and finding the soluble content thereof using gel permeation chromatography based on polystyrene (sample solution: sample 20 mg/THF 10 mL, measurement temperature: 25° C., detector: differential refraction system, injection amount: 1 mL). One example measurement method is exemplified by a method in which tetrahydrofuran is used as a mobile phase, a GPC system, manufactured by Tosoh Corporation (trade name HLC-8220 GPC) is used as a system, and a TSK guard column Super HZ-H and TSK gel Super HZM-H (trade name, a polystyrene gel) manufactured by Tosoh Corporation are used as column fillers. The weight average molecular weight can be obtained according to the method. When it is difficult to dissolve the (meth)acrylate resin or the acrylonitrile-styrene resin in tetrahydrofuran, the solvent used as the mobile phase can be appropriately changed.

The residual monomer content of the viscosity modifier may be measured under the following conditions using a hydrogen flame ionization detector GC/FID and a gas chromatograph GC-2010 manufactured by SHIMADZU CORPORATION.

Column Rtx-1 manufactured by SHIMADZU GLC Ltd. Material: fused silica, Liquid phase: chemically-bonded 100% dimethylpolysiloxane Preparation of solvent: A solvent obtained by dissolving the ribbon-shaped resin in methylene chloride at a concentration of 1% (10000 ppm) (0.1 g/10 mL) may be used.

Injected amount: 1.0 μL

Temperature of vaporizing chamber: 180° C.

Column oven temperature program: The temperature of a column oven may be set to 40° C., held at 40° C. for 5 min, increased to 270° C. at a rate of 10° C./min, and held at 270° C. for 30 min for analysis.

The chain extender and/or the viscosity modifier in the present disclosure may have less than 1000 ppm of residual reactive monomer and less than 2000 ppm of total residual monomer. In comparison with an example of a commercial chain extender, Joncryl 4400 has more than 2,000 ppm of residual glycidyl methacrylate (GMA) and more than 3,000 ppm of total residual monomers. The reactive monomers are well known as toxic materials.

Preparation

The viscosity modifier of embodiments of the present disclosure can be produced by any known methods such as bulk polymerization, melt polymerization, solution polymerization, suspension polymerization, microsuspension polymerization, dispersion polymerization, or emulsion polymerization. Of these polymerization methods, one or more particular embodiments may use microsuspension polymerization, dispersion polymerization, or emulsion polymerization, which may advantageously result in good dispersion of the viscosity modifier into the condensation polymer. Optionally, the viscosity modifier may be pelletized. A setting temperature of extruder barrel at which the viscosity modifier is pelletized may have a lower limit 80° C., 90° C., 100° C., 110° C. and 120° C. and an upper limit of 190° C., 200° C., 210° C., 220° C., 230° C. and 240° C., where any lower limit can be used in combination with any upper limit. An rpm at which the viscosity modifier is pelletized may have a lower limit of 50 rpm, 60 rpm, 70 rpm, 80 rpm, 90 rpm and 100 rpm and an upper limit of 250 rpm, 260 rpm, 270 rpm, 280 rpm 290 rpm and 300 rpm, where any lower limit can be used in combination with any upper limit In particular embodiments, the chain extender may be initially formed, such as by radical polymerization, and then the carrier resin may be polymerized, such as by emulsion polymerization or a method other than condensation polymerization. However, it is also envisioned that the viscosity modifier may be formed by a powder blend or a melting blend rather than by emulsion polymerization. The viscosity modifier added to the extruder is preferably made by melt blending or emulsion polymerization, more preferably by emulsion polymerization due to effectively preventing bridging at the extruder hopper.

In particular embodiments, the chain extender may be initially formed, such as by radical polymerization, and then the carrier resin may be polymerized, such as by emulsion polymerization or a method other than condensation polymerization, in the presence of the chain extender such that the chain extender may be dispersed in the microstructure of the carrier resin. However, it is also envisioned that the viscosity modifier may be formed by a powder blend or a melting blend rather than by emulsion polymerization.

In one or more embodiments, the chain extender may be formed in the presence of a chain transfer agent, in which alkyl mercaptans such as t-dodecylmercaptan, n-dodecylmercaptan, t-decylmercaptan, n-decylmercaptan and n-octylmercaptan and alkyl ester mercaptans such as 2-ethylhexyl thioglycollate can be used. To avoid a foul odor during mold processing, alkyl ester mercaptans such as 2-ethylhexyl thioglycollate are preferable. In other embodiments, a mixture of chain extender and carrier resin may be pelletized with the temperature profile being the same as the boiling point to eliminate odor.

Condensation Polymer

The composition of the present disclosure may include at least one condensation polymer selected from the group consisting of thermoplastic polyesters, polyamides, polycarbonates, poly urethanes, polyacetals, polysulfones, polyphenylene ethers, polyether sulfones, polyimides, polyether imides, polyether, ketones, polyether-ether ketones, polyaryl ether ketones, polyarylates, polyphenylene sulfides, and polyalkyls.

Thermoplastic Polyester Resin

In one or more embodiments, aromatic, heterocyclic, and/or aliphatic polyester resins can be used as the condensation polymer employed in the present disclosure. An aromatic polyester resin, a polyester having an aromatic ring at the chain unit of the polymer, is a polymer or copolymer that can be obtained by means of a polycondensation reaction in which an aromatic dicarboxylic acid and a diol (or the ester-forming derivatives thereof) serve as the main ingredients.

Examples of aromatic dicarboxylic acids that can be cited include terephthalic acid, isophthalic acid, o-phthalic acid, 1,5-naphthalenedicarboxylic acid, naphthalene-2,5-dicarboxylic acid, naphthalene-2,6-dicarboxylic acid, biphenyl-2,2'-dicarboxylic acid, biphenyl-3,3'-dicarboxylic acid, biphenyl-4,4'-dicarboxylic acid, diphenylether-4,4'-dicarboxylic acid, diphenylmethane-4,4'-dicarboxylic acid, diphenylsulfone-4,4'-dicarboxylic acid, diphenylisopropylidene-4,4'-dicarboxylic acid, 1,2-bis(phenoxy)ethane-4,4'-dicarboxylic acid, anthracene-2,5-dicarboxylic acid, anthracene-2,6-dicarboxylic acid, p-terphenylene-4,4'- dicarboxylic acid and pyridine-2,5-dicarboxylic acid. Of these, the use of terephthalic acid, isophthalic acid, o-phthalic acid, and naphthalene-2,6-dicarboxylic acid is especially desirable.

Also, two or more of these aromatic dicarboxylic acids may be mixed and used. Among heterocyclic dicarboxylic acids that may be used are thiophene-2.4- and 2.5-dicarboxylic acids, furane-2.5-dicarboxylic acid, N-methyl-pyrrole-2.5-dicarboxylic acid, pyrane-2.6-dicarboxylic acid, pyridine-2.5-, 2.6- and 3.5-dicarboxylic acids, furane-2.5-diacrylic acid, 4.7-dioxy-quinaldine, and 5-oxy-pyridine-2-carboxylic acid. The most suitable heterocyclic dicarboxylic acid is furane-2.5-dicarboxylic acid. Also, one or more aliphatic dicarboxylic acids such as adipic acid, azelaic acid, dodecanedioic acid, and sebacic acid, or alicyclic dicarboxylic acids such as cyclohexanedicarboxylic acid, may be used in small amounts together with these aromatic dicarboxylic acids.

Examples that may be used are the diol component those, with a including aliphatic diols such as ethylene glycol, propylene glycol, butylene glycol, hexylene glycol, neopentyl glycol, 2-methylpropane-1,3-diol, diethylene glycol and triethylene glycol; alicyclic diols such as cyclohexane-1,4-dimethanol; and mixtures thereof. Also, a small amount of one or more long-chain diols having a molecular weight of 400-6000 may be copolymerized; examples of these include polyethylene glycol, poly-1,3-propylene glycol and polytetramethylene glycol.

Specific examples of aromatic polyester resins that can be cited include polyethylene terephthalate (PET), polyethylene terephthalate glycol modified (PET-G), polypropylene terephthalate, polybutylene terephthalate (PBT), polyethylene naphthalate, polybutylene naphthalate, polyethylene-1,2-bis(phenoxy)ethane-4,4'-dicarboxylate, polycyclohexylenedimethylene terephthalate (PCT), and polycyclohexane dimethanol terephthalate. Copolymeric polyesters such as polyethylene isophthalate/terephthalate, polybutylene terephthalate/isophthalate and polybutylene terephthalate/decane dicarboxylate may also be cited. Of these, polyethylene terephthalate and copolyester containing ethylene glycol or cyclohexane dimethanol and a unit derived from isophthalic acid are preferable.

Specific examples of aromatic polyester resins that can be cited include polyethylene franoate (PEF).

The aliphatic polyester resin, a polymer having a fundamental constituent unit consisting of an ester bond and an aliphatic group, and examples of a component unit include an aliphatic polyvalent carboxylic acid, an aliphatic polyhydric alcohol, aliphatic hydroxycarboxylic acid, and aliphatic lactone; specifically, aliphatic polyvalent carboxylic acids such as succinic acid, adipic acid, sebacic acid, and fumaric acid, or derivatives thereof; aliphatic polyhydric alcohols such as ethylene glycol, propylene glycol, butanediol, hexanediol, octanediol, neopentyl glycol, glycerin, isosorbide, trimethylolpropane, and pentaerythritol; an aliphatic polyvalent alcohol in which ethylene oxide or propylene oxide is added to trimethylolpropane or pentaerythritol, diethylene glycol, triethylene glycol, polyethylene glycol, and polypropylene glycol, or derivatives thereof, aliphatic hydroxycarboxylic acids such as lactic acid, citric acid, malic acid, glycolic acid, 3-hydroxybutyric acid, 4-hydroxybutyric acid, 4-hydroxyvaleric acid, and 6-hydroxycaproic acid, and aliphatic lactones such as glycolide, ε-caprolactone, ε-caprolactone, β-propiolactone, δ-butyrolactone, β- or γ-butyrolactone, pivalolactone, and δ-valerolactone. A plurality of kinds of component units may be copolymerized and, from a viewpoint of physical properties such as melting point, it may be preferable that 50 mole % or more of all component units are occupied by two or fewer kinds of component units.

In particular embodiments, an aliphatic polyester resin may include polylactic resin. A polylactic resin used in the present disclosure can be used without limit, as long as the resin is a copolymer of polylactic acid or lactic acid as the main component (i.e., more than 50% by weight of the entire acid component) and another hydroxycarboxylic acid. Examples of the lactic acid are L-lactic acid and D-lactic acid and polylactic acid can be synthesized by a conventionally known method such as dehydration condensation of lactic acid and by ring-opening polymerization of lactide, which is a cyclic dimer of lactic acid. When conducting dehydration condensation, any lactic acid such as L-lactic acid, D-lactic acid, DL-lactic acid, or a mixture thereof can be used. The construction mol ratio (L-lactic acid/D-lactic acid) of L-lactic acid units and D-lactic acid units in poly-lactic acid can be 100/0 to 0/100, but the L/D ratio is preferably 100/0 to 60/40, more preferably 100/0 to 80/20.

The process for preparing the condensation polymer composition of the present disclosure is not particularly limited and known methods can be employed. For example, the method of obtaining the resin composition by mixing the thermoplastic polyester resin and the viscosity modifier for a condensation polymer in advance using a Henschel mixer or a tumbler and thereafter, melt kneading using a single-screw extruder, twin-screw extruder, banbury mixer or heating roll can be employed.

Furthermore, a high concentration master batch, in which the viscosity modifier for a condensation polymer is mixed in a range of more than 1 parts by weight to 100 parts by weight of the condensation polymer, can be prepared in advance. Then, in mold processing, the master batch can be used by mixing and diluting with condensation polymer, so that the amount of the viscosity modifier becomes the desired amount within the range of 0.2 to 10 parts by weight, more preferably 0.5 to 5 parts by weight, and even more preferably 1 to 3 phr parts by weight.

When necessary, to the condensation polymer composition of the present invention, other additives such as anti-oxidants, lubricants, filler, flame retardants, and antistatic agent can be added alone or in combination.

A process for obtaining a molded article from the condensation polymer composition of the present disclosure can include any molding method. In one or more embodiments, a molded article is made using a process selected from the group consisting of blow molding, injection molding, extrusion, foam extrusion, compression molding, rotational molding, calendaring, and fiber spinning. Even in extrusion molding and calender molding which require higher melt viscosity in melt processing, stable processability is exhibited and a molded article having favorable surface properties can be obtained. Further, in particular embodiments, the molded article may be an expanded article, and thus, the composition may include a foaming agent therein and use molding techniques which require higher melt strength in melt processing, etc.

EXAMPLES

Example A—Synthesis

An example of a synthesis of a viscosity modifier of the present disclosure is set forth (specifically corresponding to Example E1 referenced below). Initially, the following ingredients were added into a reactor: purified water (180 phr), sodium ethoxyalkylated alkyl phosphate ester (1.5 phr), EDTA (0.003 phr), Ferrous sulfate 7-Hydrate (0.001 phr), and t-Butylhydroperoxide (0.08 phr). Then, the following monomer mixture (81% styrene and 19% GMA) was added into the reactor for 150 minutes: styrene (40.5 phr), GMA (9.5 phr), and n-octyl mercaptane (0.9 phr). The temperature was increased to 80° C. during agitation, and nitrogen was bubbled for 30 min. Sodium Ethoxyalkylated Alkyl Phosphate Ester (0.2 phr) and t-Butylhydroperoxide (0.03 phr) were then added into the reactor, and the mixture was allowed to react until conversion reached over 90%. The temperature was decreased to 50° C., and a period of 30 min was allowed to pass.

Then, the following monomer mixture (13.4% BA, 2% GMA, and 84.6% styrene) was added into the reactor: butyl acrylate (6.72 phr) and styrene (43.28 phr). sodium ethoxy-alkylated alkyl phosphate ester (0.2 phr) and t-butylhydroperoxide (0.03 phr) were added into the reactor, and the mixture was allowed to react until conversion reached over 98%. A latex having a particle size of 1100 Angstroms was formed.

To collect the latex particles as a powder, the latex was added quickly to a 5% calcium chloride solution with agitation. The temperature was maintained at 65° C. by steam. Then, the temperature was increased to 95° C. to dehydrate the mixture. Following drying, a powder was sieved by an 18 mesh screen.

Example B—Testing Processability

Using the above described synthesis route (but with differing monomer mixtures), the following viscosity modifier examples were formed. The molecular weights were determined, and the processability of the compositions were determined in a pan test. In the pan test, the following scoring shown in Table 1 was used:

TABLE 1

| Score | Result |
|-------|--------|
| 1 | Totally melt |
| 2 | Partially melt |
| 3 | Flattened at bottom |
| 4 | Cake formed |
| 5 | Powder formed |

The formulations and results are shown in Table 2 below. It is noted that E10 (MVI-10) is made by pelletizing 10 grams of MVI-7, using a temperature of 180° C. and a rotation of 200 rpm for 1 min to form a strand that is cut into pellets.

The viscosity modifier formulations shown in Table 2 were then formulated into a thermoplastic polyester composition in combination with PET, and the properties of the compositions were tested. The results are shown in Table 3.

TABLE 2

| | | | E1 | E2 | E3 | CE2 | E4 | E5 | E6 |
|---|---|---|---|---|---|---|---|---|---|
| | MVI | | MVI-1 | MVI-2 | MVI-3 | MVI-C2 | MVI-4 | MVI-5 | MVI-6 |
| A1 | Total (phr) | | 50 | 50 | 50 | 100 | 70 | 60 | 50 |
| | ST | | 81.00% | 78.00% | 60.00% | 78.00% | 81.00% | 81.00% | 81.00% |
| | GMA | | 19.00% | 22.00% | 40.00% | 22.00% | 19.00% | 19.00% | 19.00% |
| | MMA | | | | | | | | |
| | t-DM | | | 1.80% | | | | | |
| | n-OM | | 1.80% | 1.80% | 6.00% | 0.90% | 0.90% | 0.90% | 0.90% |
| | a-pinene | | | | | | | | |
| A2 | Total (phr) | | 50 | 50 | 50 | 0 | 30 | 40 | 50 |
| | ST | | 86.60% | 87.30% | 86.60% | — | 87.30% | 87.30% | 87.30% |
| | BA | | 13.40% | 12.70% | 13.40% | — | 12.70% | 12.70% | 12.70% |
| | GMA | | 2.00% | | | — | 2.00% | 2.00% | 2.00% |
| | n-OM | | | | | | | | |
| RI of A1 | | | 1.577 | 1.575 | 1.561 | 1.575 | 1.577 | 1.577 | 1.577 |
| Mn of A1 | GPC, PSt STD | | 6,000 | 4,600 | 4,400 | 5,200 | 6,700 | 6,700 | 6,700 |
| Mw of A2 | GPC, PSt STD | | 260,000 | 224,000 | 317,000 | — | 627,000 | 627,000 | 627,000 |
| RI of A2 | | | 1.574 | 1.576 | 1.575 | | 1.574 | 1.574 | 1.574 |
| Residual monomer (GMA/total) | GC, ppm | | | | | | | | |
| Processability | Pan test | | 3 | 3 | 3 | 1 | 2 | 3 | 3 |

| | | | CE3 | CE4 | E7 | E8 | E9 | E10 |
|---|---|---|---|---|---|---|---|---|
| | MVI | | MVI-C3 | MVI-C4 | MVI-7 | MVI-8 | MVI-9 | MVI-10 |
| A1 | Total (phr) | | 10 | 0 | 50 | 50 | 50 | 50 |
| | ST | | 81.00% | | 78.00% | 78.00% | 78.00% | 78.00% |
| | GMA | | 19.00% | | 22.00% | 22.00% | 22.00% | 22.00% |
| | MMA | | | | | | | |
| | t-DM | | | | 1.00% | | 1.00% | 1.00% |
| | n-OM | | 0.90% | | 2.00% | | 2.00% | 2.00% |
| | a-pinene | | | | 1.00% | | 1.00% | 1.00% |
| A2 | Total (phr) | | 90 | 100 | 50 | 50 | 50 | 50 |
| | ST | | 86.60% | 86.60% | 86.60% | 86.60% | 86.60% | 86.60% |
| | BA | | 13.40% | 13.40% | 13.40% | 13.40% | 13.40% | 13.40% |
| | GMA | | 2.00% | 2.00% | | | | |
| | n-OM | | | | | | 0.60% | |
| RI of A1 | | | | 1.577 | 1.575 | | | |
| Mn of A1 | GPC, PSt STD | | 6,700 | 6,700 | 4,700 | 11,600 | 4,500 | 4,800 |
| Mw of A2 | GPC, PSt STD | | 627,000 | 627,000 | 305,000 | 530,000 | 75,000 | 320,000 |
| RI of A2 | | | 1.574 | 1.574 | 1.574 | | | |
| Residual monomer (GMA/total) | GC, ppm | | | | N.D/65 | | | |
| Processability | Pan test | | 4 | 4 | 3 | 3 | 2 | 4 |

TABLE 3

| | | | | E11 | E12 | E13 | E14 | E15 | CE6 | CE7 |
|---|---|---|---|---|---|---|---|---|---|---|
| | MVI | | CE5 | MVI-1 | MVI-1 | MVI-1 | MVI-2 | MVI-3 | MVI-1 | MVI-C2 |
| Compound | PET | | 100 | 100 | 100 | 100 | 100 | 100 | 100 | 100 |
| | MVI | | 0 | 1.26 | 2.2 | 5 | 2.2 | 2 | 10 | 2.0 |
| | Total | | 100.0 | 101.3 | 102.2 | 105.0 | 102.2 | 102.0 | 103.1 | 103.1 |
| melt viscosity | Max Force | | 2798 | 2875 | 3098 | 4188 | 3098 | 3270 | Can't get test pieces | 3393 |
| Optical property | YI | | 2.8 | 3.4 | 4.4 | 7.5 | 4.4 | 4.2 | | 3.2 |
| | Haze | | 2.3 | 4.1 | 5.6 | 9.3 | 5.6 | 8.2 | | 6.2 |
| Impact property | Gardner, H50(in) | | 13.9 | — | — | — | — | — | | — |

TABLE 3-continued

| | | Example | | | | | | | |
|---|---|---|---|---|---|---|---|---|---|
| | | E16 | E17 | CE8 | E18 | CE11 | E19 | E20 | E21 |
| MVI | | MVI-5 | MVI-6 | MVI-C4 | MVI-7 | MVI-C3 | MVI-8 | MVI-9 | MVI-10 |
| Compound | PET | 100 | 100 | 100 | 100 | 100 | 100 | 100 | 100 |
| | MVI | 2.0 | 2.0 | 2.0 | 1.95 | 2 | 2 | 2 | 2 |
| | Total | 102.0 | 102.0 | 103.1 | 102.0 | 102 | 102 | 102 | 102 |
| melt viscosity | Max Force | 0 | 0 | 2712 | 3324 | 2811 | 2865 | 3105 | 3462 |
| Optical property | YI | 3.8 | 4.0 | 6.6 | 3.2 | 3.4 | 3.3 | 3.5 | 3.2 |
| | Haze | 6.05 | 6.4 | 6.8 | 4.7 | 5.6 | 4.5 | 4.7 | 4.8 |
| Impact property | Gardner, H50(in) | — | — | — | 22.1 | — | — | — | — |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed:

1. A viscosity modifier for a condensation polymer, comprising:
a chain extender comprising a copolymer of at least one reactive monomer and at least one vinyl monomer copolymerizable with the reactive monomer, the chain extender being present in an amount ranging from 15 to 70 wt % of the viscosity modifier; and
a non-condensation carrier resin present in an amount ranging from 30 to 85 wt % of the viscosity modifier, wherein:
the at least one reactive monomer comprises at least one reactive group selected from the group consisting of an epoxy group, a hydroxyl group, a carboxyl group, an isocyanate group, an acid anhydride group, and an acyl chloride group, and
the non-condensation carrier resin further comprises one or more reactive monomer which does not react with the monomer in the chain extender in an amount of less than 10 wt % of the non-condensation carrier resin.

2. The viscosity modifier of claim 1, wherein the chain extender has a number average reactive functionality ranging from 2 to 10 per molecule.

3. The viscosity modifier of claim 1, wherein the chain extender has a number average molecular weight less than 10,000 Da.

4. The viscosity modifier of claim 1, wherein the chain extender comprises at least one epoxy-functional (meth) acrylic monomer as the reactive monomer and at least one styrenic and/or (meth) acrylic monomer as the vinyl monomer.

5. The viscosity modifier of claim 1, wherein the viscosity modifier is made by powder blending, melt blending, or emulsion polymerization.

6. The viscosity modifier of claim 5, wherein the viscosity modifier is made by emulsion polymerization.

7. The viscosity modifier of claim 1, wherein the non-condensation carrier resin comprises at least one styrenic and/or (meth) acrylic monomer.

8. The viscosity modifier of claim 1, wherein the non-condensation carrier resin has a weight average molecular weight ranging from 100,000 to 1,000,000 Da.

9. The viscosity modifier of claim 1, wherein the chain extender and/or the viscosity modifier have less than 1000 ppm of residual reactive monomer and less than 2000 ppm of total residual monomer.

10. A condensation polymer composition, comprising:
the viscosity modifier of claim 1; and
at least one condensation polymer.

11. The condensation polymer composition of claim 10, wherein the viscosity modifier is present in an amount ranging from 0.2 to 10 parts per hundred resin.

12. The condensation polymer composition of claim 10, wherein the chain extender and the non-condensation carrier resin of the viscosity modifier each have a refractive index value that is within 0.03 the refractive index value of the condensation polymer matrix.

13. The condensation polymer composition of claim 10, wherein at least one of the condensation polymers is selected from the group consisting of polyesters, polyamides, polycarbonates, polyurethanes, polyacetals, polysulfones, polyphenylene ethers, polyethersulfones, polyimides, polyether imides, polyether ketones, polyether-ether ketones, polyarylether ketones, polyarylates, polyphenylene sulfides, and polyalkyls.

14. The condensation polymer composition of claim 13, wherein at least one of the condensation polymers is a thermoplastic polyester resin.

15. The condensation polymer composition of claim 14, wherein the thermoplastic polyester resin is an aromatic polyester resin formed from an aromatic dicarboxylic acid and a diol and/or ester-forming derivative thereof.

16. A molded article, comprising: the condensation polymer composition of claim 10.

17. A method, comprising: molding the condensation polymer composition of claim 10.

18. The method of claim 17, wherein the molding method is selected from the group consisting of blow molding, injection molding, extrusion, foam extrusion, compression molding, rotational molding, calendaring, and fiber spinning.

19. A method, comprising: forming the viscosity modifier of claim 1 by powder blending, melt blending, or emulsion polymerization.

20. The method of claim 19, wherein the viscosity modifier is formed by emulsion polymerization.

* * * * *